C. B. HATFIELD.
STEERING MECHANISM FOR SELF PROPELLED VEHICLES.
APPLICATION FILED APR. 24, 1907.
901,898.
Patented Oct. 20, 1908.
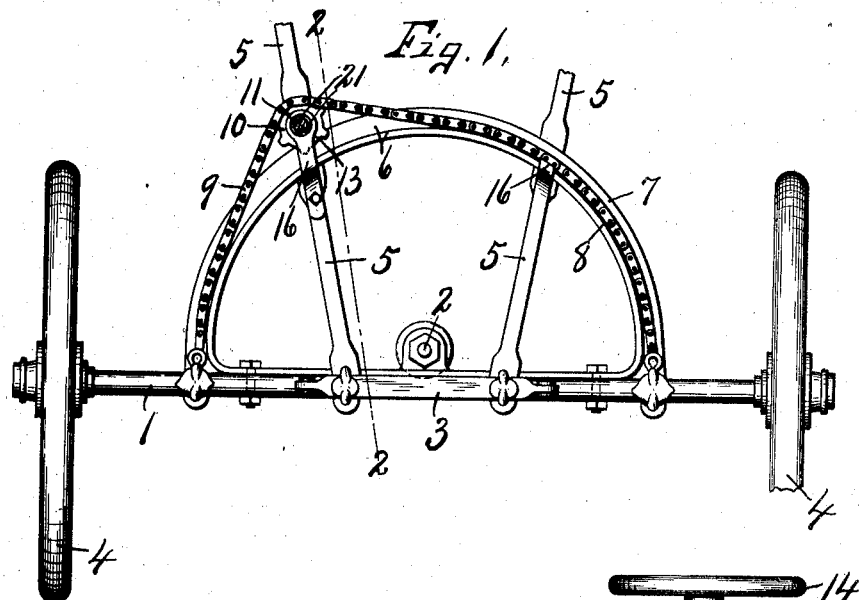
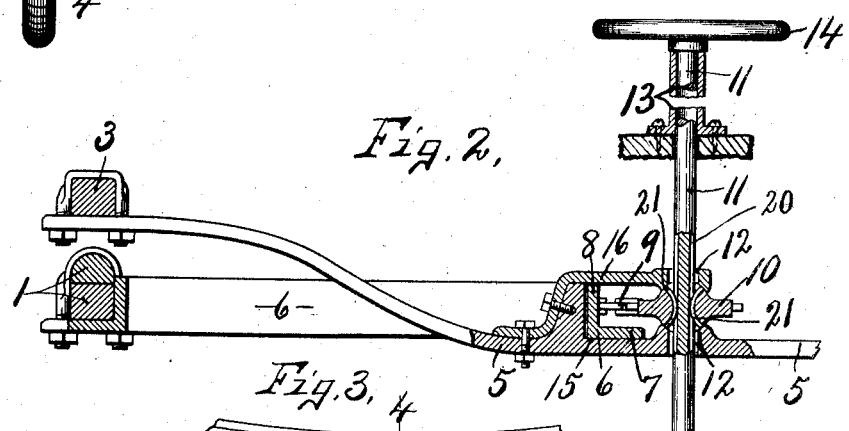
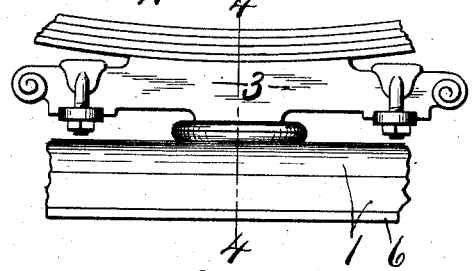
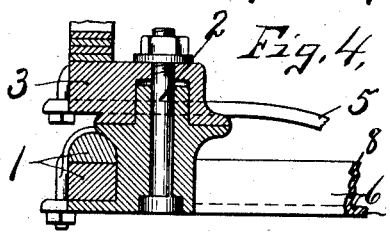

UNITED STATES PATENT OFFICE.

CHARLES B. HATFIELD, OF CORTLAND, NEW YORK, ASSIGNOR TO HATFIELD MOTOR VEHICLE COMPANY, OF CORTLAND, NEW YORK, A CORPORATION OF NEW YORK.

STEERING MECHANISM FOR SELF-PROPELLED VEHICLES.

No. 901,898.  Specification of Letters Patent.  Patented Oct. 20, 1908.

Original application filed January 26, 1907, Serial No. 354,308. Divided and this application filed April 24, 1907. Serial No. 370,027.

*To all whom it may concern:*

Be it known that I, CHARLES B. HATFIELD, of Cortland, in the county of Cortland, in the State of New York, have invented new and useful Improvements in Steering Mechanism for Self-Propelled Vehicles, of which the following, taken in connection with the accompanying drawings, is a full, clear, and exact description.

This invention relates to certain improvements in steering mechanisms for self-propelled vehicles of the class set forth in my pending applications Nos. 354,308, filed Jan. 26, 1907, and 355,519, filed February 2, 1907, of which this is a divisional application.

It will be observed that in each of these cases an ordinary horse vehicle involving the use of a centrally pivoted front steering axle is equipped with a self-propelling mechanism and that the steering mechanism comprises essentially a circular segment concentric with the swinging axis of the steering axle, and constituting at once a guide and bearing for a flexible steering element having its ends connected to said axle equidistant from and at opposite sides of its axis and intermediate portion engaged with a suitable sprocket or operating member on the lower end of the steering post.

My main object is to provide a simple, practical and reliable steering mechanism for axles of this character by establishing a flexible connection between the steering post and points some distance from and at opposite sides of the swinging axis of the axle so as to obtain a comparatively long leverage upon the axle and thereby reduce the strain upon the parts of the steering mechanism.

Another object is to provide the axle with a rigid concentric segment of comparatively long radius and constituting at once a fifth wheel section and guide or bearing for the flexible connection between the steering post and axle whereby said connection is maintained in proper relation to its actuating member upon the steering post.

Other more specific objects and uses will be brought out in the following description.

In the drawings—Figure 1 is a top plan of the front portion of the running gear of a self-propelled vehicle embodying my improved steering mechanism. Fig. 2 is a sectional view taken on line 2—2, Fig. 1. Fig. 3 is a front elevation of the central portions of the front axle, spring and perch. Fig. 4 is a sectional view taken on line 4—4, Fig. 3.

In order to demonstrate the practicability of my invention I have shown a steering axle —1— as centrally pivoted at —2— to the front cross bar as —3— of a running gear of a vehicle and provided with suitable wheels —4—, said running gear being provided with one or more reach bars —5— adapted to connect the front cross bar —3— to the rear axle, not shown.

Rigidly secured to the front axle —1— by any suitable fastening means is a segmental guide or bearing —6— of comparatively large radius and concentric with the swinging axis of the pivot —2— of the axle —1—, said guide or bearing —6— projecting rearwardly from the axle in a substantially horizontal plane and preferably consists of a semi-circular arc or segment of angle iron having a bottom projecting horizontal flange —7— and an upwardly projecting flange —8— which form an effective guide and bearing for a flexible steering chain or cable —9—. The opposite ends of this steering chain or cable are secured to the axle —1— at point equi-distant from and at opposite sides of the swinging axis of said axle while its intermediate portion bears upon the periphery of the vertical flange —8— and is held from downward displacement by the horizontal flange —7— upon which it rests, said steering chain being of slightly greater length than the periphery of the segment —6— upon which it bears and preferably passes partially around and is engaged with the teeth of a sprocket wheel —10— on the lower end of a steering post —11—, the latter passing through suitable openings —12— in one of the reach bars —5— and passes through a guide sleeve —13— on the body of the vehicle where it is provided with a hand wheel —14— within easy reaching distance of the seat, (not shown,) of the vehicle. In order to utilize this segment as a fifth wheel section the reach bar or bars —5— are provided with lower and upper bearings —15— and —16— of metal which engage respectively the lower and upper faces of the segment —6— to hold the latter against undue vertical vibration and at the same time to permit said segment to easily rock horizontally between them.

It will be observed that the steering post is located at one side, preferably the right hand side of the longitudinal center of the vehicle and preferably at the rear of the segment —6— and although I have shown its lower end as journaled in one of the reach bars, it is evident that any other suitable support may be provided to retain the steering post and its chain actuating member —10— with its axis in fixed relation to the swinging axis of the axle. It will also be observed that by giving the segment —6— a comparatively long radius and connecting the ends of the steering chain some distance from and at opposite sides of the swinging axis of the axle, the strain upon the king bolt or central pivotal bearing is materially reduced and at the same time a longer leverage is exerted upon the axle thereby enabling the axle to be rocked upon its axis with greater ease and with less liability of straining the steering mechanism.

The body and running gear are, of course, movable vertically relatively to each other and in order to allow for this movement without causing the cramping or binding of the steering post —11— and sprocket wheel —10—, the steering post is slidable vertically through the central opening in the sprocket wheel —10— while the sprocket wheel is rockable in its bearings to conform to any slight tilting position in which the steering post may be thrown by such relative vertical movement of the body and running gear.

The sprocket wheel —10— is, therefore, feathered upon the steering shaft —11— by providing the latter with lengthwise key ways —20— for receiving concavo convex keys —21— in the sprocket wheel whereby said sprocket wheel is locked to rotate with the shaft and at the same time the shaft is slidable therethrough, said sprocket wheel being journaled between the upper and lower bearings or arms —15— and —16— of the reach bar —5— to prevent its vertical displacement and the openings —12— through which the steering shaft passes are of slightly greater diameter than that of the shaft to prevent binding of said shaft therein by the relative vertical movement of the body and running gear.

What I claim is:

1. A steering mechanism for self-propelled vehicles in combination with a steering axle, a segmental guide secured to the axle, said guide constituting a fifth wheel section, a bearing for said segmental guide, a chain passed around the guide and connected to the axle, a steering post and means on the steering post for engaging and actuating the chain.

2. A steering gear for self-propelled vehicles comprising a centrally pivoted axle, a semi-circular segmental guide secured to and projecting rearwardly from the axle concentric with its pivot, a steering post at the rear of the segment, a sprocket wheel keyed to but slidable lengthwise upon the steering post, and a chain engaged with said sprocket wheel and extending around and upon the segmental guide and having its ends attached to the axle.

In witness whereof I have hereunto set my hand this 9th day of April 1907.

CHARLES B. HATFIELD.

Witnesses:
H. E. CHASE,
C. M. McCORMACK.